July 21 1925.
R. M. THOMPSON
PROCESS AND APPARATUS FOR SEPARATING SOLIDS FROM
LIQUIDS, AND TREATING THE SEPARATED SOLIDS
Filed Dec. 15, 1917
1,546,871
2 Sheets-Sheet 2
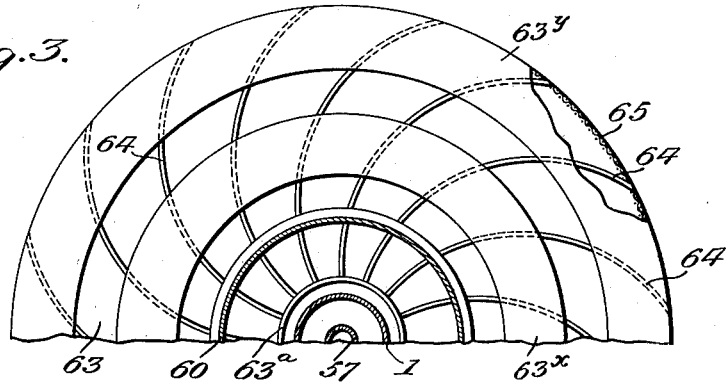
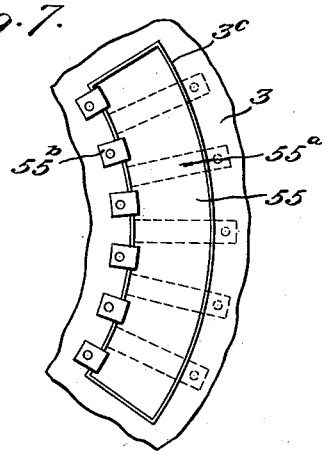
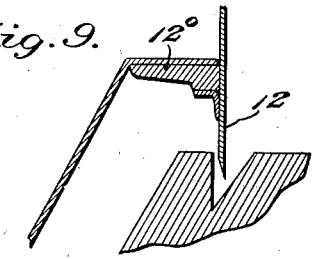
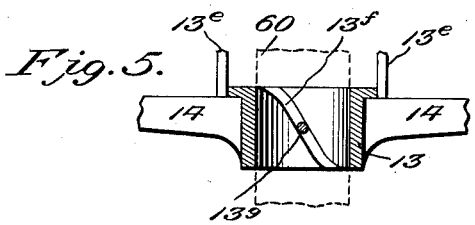
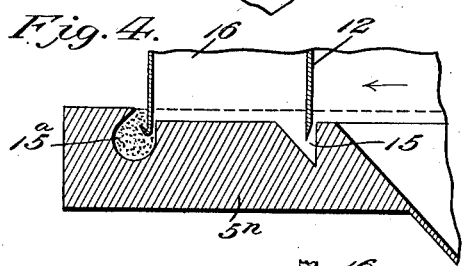
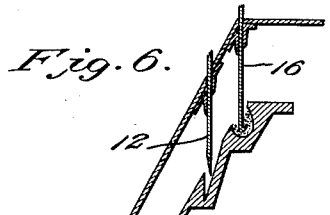
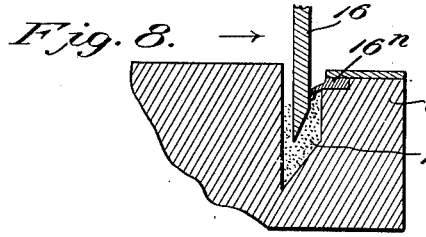
Inventor
Robert M. Thompson
By Alexander Dowell
Attorneys Patented July 21, 1925.

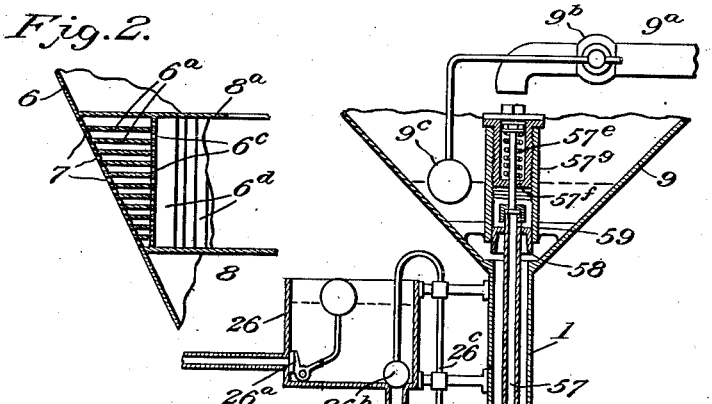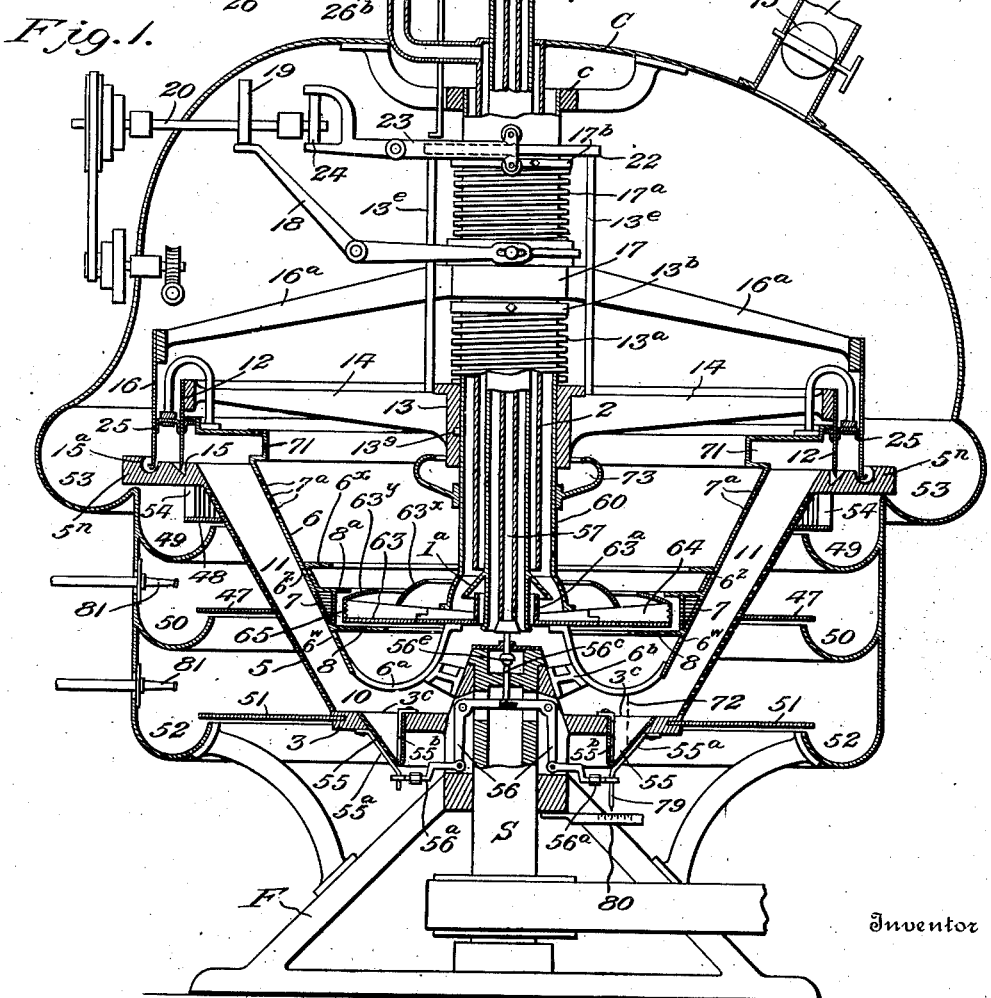

1,546,871

UNITED STATES PATENT OFFICE.

ROBERT M. THOMPSON, OF TACOMA, WASHINGTON.

PROCESS AND APPARATUS FOR SEPARATING SOLIDS FROM LIQUIDS AND TREATING THE SEPARATED SOLIDS.

Application filed December 15, 1917. Serial No. 207,310.

*To all whom it may concern:*

Be it known that I, ROBERT M. THOMPSON, a citizen of the United States, residing at Tacoma, in the county of Pierce and State of Washington, have invented certain new and useful Improvements in Processes and Apparatus for Separating Solids from Liquids and Treating the Separated Solids; and I hereby declare that the following is a full, clear, and exact description thereof, reference being had to the accompanying drawings, which form part of this specification.

This invention relates to machines and methods for continuously separating suspended solids from liquids, and it is especially designed to separate solids, such as sugar, salt, sulphate of ammonia, blue stone, etc., having such texture and consistency that the associated liquors can pass through a mass of such solids under pressure, but that the solids themselves will not pass through the separating screens.

The principal objects of the invention are to provide novel means and method for separating the liquids from the solids by centrifugal action and in such manner that the mixture of liquid containing solids in suspension can be continuously fed to the apparatus, the liquid separated from the solids, and the separated solids discharged all in one continuous series of operations, the several steps of which may be simultaneously performed at different parts of the same apparatus. Further when the process and apparatus are used to separate sugar crystals from the liquid or syrup containing them the invention also provides means for washing the separated crystals; and also means for drying the washed crystals; as steps in the continuous series of operations before the crystals are discharged.

In my invention all these operations are or may be performed simultaneously in the same apparatus and continuously instead of intermittently, thus saving power, labor and time and greatly increasing the output.

In the process of manufacturing refined sugar, it is necessary to separate the crystals from the enclosing syrups, then to wash the adhering syrup from the crystals, and then to dry the crystals. The present method is to feed the sugar or mixture into a rapidly rotating perforated bowl wherein the crystals collect on the walls while the liquid passes through the sugar crystals and escapes; then when a sufficient thickness of crystals has accumulated the supply of mixture is stopped and a measured quantity of water is passed through the mass of crystals to wash off the adhering syrup; then the bowl is operated long enough to drain off the free water; then the machine is stopped and the washed crystals removed. Each batch of mixture is thus treated.

In my invention the mixture to be separated is continually fed to the apparatus, and the separated solids are discharged therefrom as desired without stopping the apparatus and while several other steps of the process are continuously being performed. The solids are first separated from the mixture by centrifugal force; and are moved toward the discharge by such force without interrupting the supply of fresh mixture, and as they pass on the separated solids are, if desired, first washed, and after washing, if desired, are thoroughly dried by air currents before reaching the outlet; and as stated the several steps of separating, washing, drying, all proceed simultaneously at different points in the apparatus, and the solids are discharged as desired without interruption of the process or operation of the apparatus.

In the particular machine shown I provide novel means to regulate the feeding; novel means to regulate the distribution and the balance of the material being treated; novel means whereby the centrifugal pressure of the material being treated controls the supply; also novel means to positively control the movement of the solid materials through the machine; novel means for passing wash water through the separated solids before they are discharged; novel means to dry the separated and washed solids by air currents before they are discharged; novel means to regulate the supply according to the quantity of mixture in the apparatus; novel valves to control the discharge of separated solids; and novel means to supply a measured quantity of wash water after each discharge of separated solids.

I will explain the invention with reference to the accompanying drawings which illustrate one form of centrifugal separating apparatus embodying the invention, and an explanation thereof will enable others to comprehend and use the same, but the invention is not restricted to the particular construction, arrangement or combination of parts illustrated in the drawings, being capable of embodiment in varied forms, and I therefore refer to the claims following this description for summaries of the essentials of the invention and the novel combinations and novel constructions of parts for which protection is desired.

In said drawings:

Figure 1 is a sectional elevation of an apparatus embodying the invention.

Figure 2 is an enlarged detail sectional view of part of the water applying devices.

Figure 3 is an enlarged top plan view of the water distributing disk.

Figure 4 is an enlarged sectional view showing the discharge valve seats.

Figure 5 is an enlarged detail sectional view showing one means for producing a rotatorial or shear movement of the discharge.

Figure 6 is a detail sectional view illustrating a desirable arrangement of the discharge outlet and controlling valves.

Figure 7 is a detail view of bag 55.

Figure 8 is a detail view of the lower outside valve packing.

Figure 9 is a detail view of a support with packing to relieve pressure on the discharge valve.

I will explain the invention as used in separating sugar crystals from liquids containing the same in suspension, and will refer to the fluid containing the solid matters in suspension as "mixture"; and to the matters to be separated from the liquids as "solids."

As shown the machine comprises a base frame F of any suitable construction in which is journaled a vertically disposed rotatable shaft S which resembles that of a centrifugal bowl separator, and may be rotated at a very high speed by any suitable means. On this shaft above the base frame F is mounted a centrifugal separator comprising a bottom disk 3 fixed to shaft S; an outer perforated cone or wall 5 and an inner cone 6 which is spaced from the cone or wall 5 to form a passage 11 between these cones through which the separated crystals are passed to the discharge at the upper end of the separator.

The passage 11 for the solids and through the discharge portion is preferably continuously enlarging owing to the conical form of the walls, and is designed and constructed with such a degree of slope that the solids will immediately pass outwardly when the controlling valves permit.

The upper ends of the shaft S and hub of plate 3 are preferably tapered as shown to form a cone like head that assists in distribution of the mixture which is fed to the separator as hereinafter explained.

The inner cone 6 may be supported on the hub of the disk 3 and upper end of shaft S by means of an annular imperforate member 6$^a$ that may be connected by brackets 6$^b$ to the hub 3 as indicated in the drawings.

Mounted upon the member 6$^a$ is a water distributing disk 63 which has a central opening surrounded by a flange 63$^a$, and the disk is provided on its upper side with convolutely disposed flanges 64, and the disk may be provided with a peripheral screen 65 as wide as the outer depth of the flanges, and which will assist in distributing water discharged by centrifugal force from the periphery of the disk.

Upon this disk 63 is supported the lower end of a tube 60, which is disposed axially of the bowl and the upper end of the tube 60 may be journaled or guided in a suitable bearing $c$ attached to the top of the casing C of the machine, which casing encloses the moving parts, and may be of any suitable construction, and supported on the base F as shown.

Axially disposed within this sleeve 60 but not contacting therewith is a feed pipe 1 which extends outside the casing and connects with a supply hopper 9. The flow of material from the hopper 9 through the pipe 1 may be controlled by any suitable valve means. As shown a valve 58 in the hopper is connected to a tubular rod 57 that extends through the pipe 1 and is connected below the pipe with a controlling device.

It is necessary in practice to maintain a substantially uniform head or pressure of centrifugal force upon the mixture in the separating chamber in the bowl; and this I insure by permitting only such an amount of fresh mixture to enter the machine as will keep the inner wall of the mixture at a predetermined point in the separating chamber or passage 10, such as indicated by the dotted line 72, (right hand side of Fig. 1) and if any excess is supplied the mixture will enter the bag 55 and cause the closing of the valve 58 as hereinafter described. Any suitable mechanism for automatically controlling the valve 58 may be employed. I have shown a novel controlling mechanism in Figures 1 and 7 as follows: In the bottom plate 3 is a segmental slot 3$^c$ having its outer edge inclined or beveled upwardly and outwardly, and secured in and depending from the slot is a flexible offset chamber or bag 55, which depends below the plate. The outer side of this bag is supported at an angle approximately that of the inner edge of the slot by spring fingers 55$^a$, and in the inner portion thereof may be supported by spring fingers 55$^b$.

The operation of this control is as follows: The valve 58 is normally held open until such a quantity of the mixture accumulates in the separating chamber or passage 10 so it becomes filled to the extent that the mixture forms its inner face at a point within the outer edge of the flexible offset chamber and by centrifugal force the mixture is forced into said offset chamber to just such an extent that the inner face or wall of the mixture in chamber 10 will extend into or over the offset chamber. The tendency of the mixture thus confined in the offset chamber is to fly outwardly and so exert a force against the retaining springs 55$^a$ and 55$^b$ to bend them outwardly, which movement through the lever mechanism permits the valve 58 to close.

The bag is so shaped that the more the excess quantity of the mixture in the separating chamber, the greater will be the amount of mixture entering the offset chamber, so that an amplifying effect of centrifugal force is had upon the spring fingers 55$^a$ and 55$^b$ varying proportionately more than with the amount of material entering the bag.

The springs 55$^a$ are connected by an adjustable link 56$^a$ to the bell crank lever 56 which is pivoted in a slot in the hub of the disk 3, and its inner arm projects into a slot in shaft S and is connected to a rod 56$^c$ which extends upwardly toward and is operatively engaged with the lower end of the valve rod 57 of valve 58. As shown, the rod 56$^c$ may have an anti-frictional or ball-bearing joint or connection 56$^e$ with the lower end of the rod 57 so that the rotating movement of the bell crank lever 56 and rod 56$^c$ with the plate 3 will not rotate the rod 57. By this means, if the springs 55$^a$ and 55$^b$ are forced outwardly by the centrifugal pressure of mixture or solids collected in the receptacle 55, the links 56$^a$ will be forced radially outwardly, and the supply valve 58 will be lowered and more or less closed by the lowering of valve rod 57 through the action of the bell crank 56 and rod 56$^c$; this depending upon the thickness of the wall of mixture in the separating chamber upon which depends the amount of mixture which enters the bag 55. As the surplus mixture is discharged, the amount of mixture in the bag 55 diminishes (as it will escape therefrom by centrifugal action when permitted) and the springs tend to raise the supply valve and replenish the supply.

The valve 58 is normally and yieldably held in open or raised position by any suitable means, which means, as shown in Fig. 1 preferably comprises an expansion spring 57$^e$ interposed between a lip on the upper end of rod 57 and the bottom of a sleeve nut 57$^f$ engaged in a tubular holder 57$^g$ secured within the hopper above the valve, the nut and spring being enclosed to protect them from the mixture.

The valve rod 57 is preferably tubular with an opening above the valve 58 and another near its lower end to permit the escape of any fluid that might leak between the valve and its housing 59.

The mixture fed from the hopper through pipe 1 passes to the bottom of the bowl beneath the disk 63 and between the member 6 and plate 3, the mixture being distributed in chamber 10 by the conical hub of the plate 3 and passing outwardly into the lower end of the passage 11 between the cones 5 and 6. The liquid escaping through the screen 5 below the plates 8 and 47 and above the annular plate 51 into a receiver 52 on the casing enclosing the separating bowl. It is intended that the thick undiluted syrup be taken off at one outlet 52 and the diluted syrup at another 50, also no water should be permitted to reach the perforation where the drying air is passing otherwise some of the good effect of drying is lost.

Surrounding the supply pipe 1 within the casing is a sleeve 2 which extends within the tube 60 to a point slightly above the flange 63$^a$ on the disk 63, water being directed through this sleeve onto the disk 63 within the lower end of the tube 60. To prevent water passing through the axial opening in the disk 63 I preferably provide a conical flange 1$^a$ on the pipe 1 just below the lower end of the sleeve 2; said flange 1$^a$ directing the water outwardly over and below the upper edge of the flange 63$^a$ on disk 63.

The inner cone or wall 6 is perforated as at 7 directly opposite the periphery of the disk 63 so as to permit the water discharged from this disk as hereinafter explained to pass by centrifugal force through the solids in the passage 11 opposite this disk; the escaping water being directed by an annular plate or ring 47 into an adjacent channel or receiver 50 in the casing. Above and below the perforations 7 are annular plates 8 and 8$^a$ which are adapted to confine the water discharged from disk 63 to the perforated area 7 of the cone.

To obtain an even distribution of the wash water it is desirable that the ribs 64 on the disk 63 be convolutely curved so as to cause the water to fly more radially outward and provide as much difference as possible between the movement of the water with the disk and the movement of the opposed perforated section 7 of the cone or wall 6 to produce the desired distribution of the water over the perforated section 7 of the cone.

To cause an even pressure or supply of the water to the inside cone or wall 6 at the perforated part 7 I preferably place opposite the perforated section 7 and between the plates 8, 8$^a$ a vertical screen 6$^c$, and at the inside thereof a number of spaced vertically arranged radially disposed ribs or wings 6ᵈ to distribute the water to the screen 6ᶜ, and to further insure an equal supply of water to the part 7 I place annular superposed flat rings 6ᵃ spaced apart between the screen 6ᶜ and part 7, these rings 6ᵃ lying perpendicular to the axis of rotation, catch the water entering through the screen 6ᶜ and uniformly distribute it to part 7.

The amount of water supplied at each washing operation may be regulated in any desired manner. As shown I use an ordinary tank 26 having a float controlled inlet valve 26ᵃ designed to close when the proper amount of water is in the tank. The tank has an outlet valve 26ᵇ preferably operatively controlled by the movement of the valve 12. As shown the valve 26ᵇ is connected to a bent rod 26ᶜ the outer end of which extends in position to be engaged and raised by the ring 22 when the latter is raised to open valve 16 thus opening the valve 26ᵇ and allowing the measured quantity of water in tank 26 to flow to the disk 63.

At a point above the perforations 7 the inner cone or wall 6 is perforated as at 7ᵃ for the passage of air which is drawn therethrough by fan blades 54 attached to the outer side of the cone 5, and when the cones are rotated these blades create a powerful suction of air through the solids in passage 11 opposite the perforated part 7ᵃ and the moisture drawn off from the solids by the air is caught in a receiver 49 attached to the casing.

The discharge of material from the upper end of the passage 11 may be controlled by any suitable means. I preferably employ annular knife valves 12 and 16. The inner valve 12 is connected to a spider 14 having a hub 13 which is slidably mounted upon the tube 60. The outer valve 16 is concentric with the valve 12 and is shown as attached to a spider 16ᵃ connected with a hub 17 also slidably mounted upon the tube 60.

A spring 13ᵃ may be arranged on tube 60 between a set collar 13ᵇ and hub 13 to assist in closing valve 12; and a spring 17ᵃ may be arranged between a set collar 17ᵇ and hub 17 to assist in closing the valve 16. The valves may be operated at the proper times by any suitable means. As shown valve 16 can be opened at the proper time by means of a lever 18 pivotally supported in the casing and engaging the hub 17 and a cam 19 on a shaft 20.

The valve 12 may be operated from the same shaft and as shown the hub 13 is connected by rods 13ᵉ to a slidable ring 22 on the tube 60 above the hub 17 and this ring is actuated by a lever 23, controlled by a cam 24 on the shaft 20. The shaft 20 may be driven by any suitable mechanism, and the cams should be so proportioned and timed that the valves 12 and 16 may be opened and closed preferably alternately as hereinafter explained. The solids after passing the valves may be discharged into a receiver 53 attached to the casing.

The annular valves 12 and 16 are preferably timed and operated substantially like the two valves on a 4 cycle gas engine and may be packed against leakage in a manner similar to the piston of a hydraulic press under operative conditions of extraordinary pressure. However, instead of using leather a spring metal packing 25 may be used so that the elasticity of the metal will overcome the tendency to collapse due to centrifugal force; particularly as regards the packing for the outside of valve 12.

In controlling solid materials by valves great difficulty is experienced in getting the valves to properly seat, and in keeping the valve seats from wearing. I overcome this difficulty by using the solids of the mixture for the seats. For this purpose, as shown in Fig. 4, I preferably provide an annular groove 15 in the outer top rim 5ⁿ of the bowl below the valve 12, and a similar groove 15ᵃ below the valve 16; and the solids caught in these grooves will form a packing for the knife edges of the valve. The valves will probably need no packing when working on sugar, a sliding fit being close enough to keep crystals from leaking.

As shown in Fig. 4, the outer edge of the valve-seat groove 15ᵃ may be slightly higher than the inner edge and the groove so shaped as to retain and divert a portion of the passing solids. The outer edge of the valve seat should extend sufficiently close to the edge of the valve to overcome the tendency of the solids to discharge by centrifugal action.

As shown in Fig. 8 the valve 16 may be packed exteriorly by an annular ring 16ⁿ attached to the rim 5ⁿ beside the groove 15ᶜ into which the lower edge of the valve 16 enters when the valve is closed. The inner edge of ring 16ⁿ is preferably pliable so that it will have a yielding contact with the outer side of valve 16 and any pressure tending to cause leakage will press the edge of the ring more closely into contact with the valve.

In some cases it may be desirable to relieve the valves of some of the centrifugal pressure of the solids by reducing the valve area exposed to the direct action of the solids. For this purpose, if desired, an annular filler or dam 12ᶜ might be arranged at the inner side of and adjacent to the valve, preferably the inner valve 12, as indicated in Fig. 9; this filler 12ᶜ being rigidly attached to an adjacent part of the cone or separator and moving therewith and being close to the valve; the movement of the solids and pressure thereof against the valve is obstructed by this filler and the pressure thereof against the valve correspondingly reduced.

In some cases it may be desirable to have the valve 12 open and close with a shearing movement. This may be provided for by forming a spiral or inclined cam slot 13$^f$ in the hub 13, to engage a pin 13$^g$ on the rotating tube 60, see Fig. 5, so that as the valve 12 is raised or lowered, it is caused to slightly turn relatively to the tube thus giving the valve the desired shearing movement which will greatly reduce the resistance to closing. To permit the spider 14 to thus slightly rotate, the stem 13$^e$ should be flexibly attached to spider 14 and collar 22; also a slotted hole through spider 16$^a$ should be provided for stem 13$^e$. To permit the valve 12 to more readily pass through the mass of solids in closing I provide a cylindric chamber or recess 71 at the upper edge of the inner cone 6, directly opposite the valve 12 so that a quantity of solids equal to that displaced by the valve 12 may be moved inwardly into this recess, against centrifugal force, as valve 12 is closed.

To control the supply of preferably heated air for drying I control the air inlet opening 74 in the top of the stationary casing by a hand or heat regulated controlled valve 75.

To permit visually noting the amount of mixture in the machine a pointer 79 may be attached to an extension of one of the springs reinforcing the bag 55, said pointer moving past and over an index scale 80 attached to the stationary frame.

To clear any clogged perforations in the screen 5 I provide movable nozzles 81 protruding through the stationary casing, by which water may be variably directed against the exterior of the screen 5.

If it should be advisable in some cases both valves 12 and 16 may be operated together; or in some cases only one valve need be used. The hubs 13 and 17 should be made with a long bearing and snug fit on tube 60 to insure uniform opening of the valves without unbalancing the machine. To this end the valves should open absolutely true with the valve seat, and the valve seat should be true with the discharge passage. It may be desirable to have the packing against the sides of the valves such that on the outside of the inside valve it is of an elastic metal and at the other two contacts it may be of a non-rigid material as centrifugal force will keep the packing against the knife blades.

In cases where the friction load might be undesirably heavy against the valves arranged as in Fig. 1 the discharge outlet may be a conical continuation of the passage 11, and the valves 12 and 16 located one above the other, as indicated in Fig. 6.

To keep the oil necessary for lubricating between the valve bosses and outer rotating pipe from wasting and going into the solids being treated, I preferably provide cups 73 adapted to gather and hold the waste oil either by centrifugal force or the force of gravity.

*Operation.*

The mixture to be separated is fed from hopper 9, as permitted by valve 58 (said valve being controlled as hereinbefore described). The hopper and pipe 1 and sleeve 2 are stationary so the mixture is delivered into the separating chamber 10 before being rotated, and an even distribution and balancing of the mixture is made. The separating chamber 10 and its contents are rotated at very high velocity, and as the entering mixture flows outward it attains a rotating velocity and the centrifugal force forces the fluid out between the conical walls 5 and 6 and through the screens, but the solids are retained by the outer perforated wall 5 of the bowl, and by the valves 12 and 16. The fluid other than that adhering to the solids or the crystals is rapidly separated therefrom and discharged from the bowl by the time the material reaches a point even with the disk 47.

The discharge of the mass of separated solids is permitted by alternately opening and closing the valves 12 and 16. The rate of discharge is controlled by regulating the speed of the shaft 20, carrying the cams which operate the valves.

Immediately after the mass of solids in its outward and upward movement passes the perforated section 7 in the inner cone or wall 6 a proper quantity of fresh water is supplied from the tank 26 through the sleeve 2, and is evenly distributed by the disk 63 to cause an even quantity of water to be fed to all sections of the perforation section 7 of cone 6, as described.

The portion of the mass of solids that has passed through the passage 11 to a point just below the perforations 7$^a$ will have been substantially cleared from all free moisture or liquid by centrifugal force; and the portion of the mass of solids passing the perforated portion 7$^a$ is readily dried by the air (preferably heated) drawn through the mass of solids by the fan 54, and when the solids have passed the perforated section 7$^a$ they will be as dry as centrifugal force can make them and are ready to be discharged.

If the amount of mixture in the machine becomes greater than is desired, so that its inner wall or face comes within the line 72 (Fig. 1) the excess mixture will press into the flexible offset chamber or bag 55 and the valve 58 will be controlled as described. The springs are set to keep the supply valve 58 open unless the centrifugal offset of surplus material in the bag 55 overcomes the tension of the springs and permits the more or less closing of valve 58. Thus the mixture to be controlled itself regulates the control.

Positive control of the rate of movement of the separated solids must at all times be maintained, and this is preferably accomplished by the valves 12 and 16. Preferably the valves are not opened simultaneously at any time; first the valve 12 is opened and when the space between the valves is filled valve 12 is closed and valve 16 opened, discharging only the measured quantity of solids contained between the valves 12 and 16; then valve 16 is closed and valve 12 opened; this cycle of operation is continually repeated.

From the foregoing explanation and the drawings it will be seen that in this machine a constant supply of the mixture is maintained in the separating chamber by controlling the supply or the discharge or both; that the quantity of mixture in the separating chamber automatically controls the supply of fresh mixture; that by using double discharge valves operated in alternation I can obtain an intermittent unobstructed discharge of the material and maintain the balance of machine during discharge; that the machine is balanced at all stages of the process; that the solids have a substantially uniform rate of movement through or time of treatment in the machine and pass out in a uniform layer or thickness, so that the discharged solids will be equally washed and equally dried, resulting in a uniform product; that the mixture of solids is retained in definite shape and thickness both for washing and drying, and in the discharging operation; that the rate at which the solids pass through the machine is easily controlled by regulating the speed of operation of the discharge valves; that the quantity of wash water passed through the solids is easily controlled by the measuring device which is in turn regulated by the amount of solids being treated. Each opening of the discharge valve permits a certain measured quantity of solids to pass out of the separating chamber and passage 11, and hence likewise permits an equal measured quantity of mixture to be entered into the separating chamber 10. Also, at each discharge operation, the bar 26° is raised by contact with the raised lever 23. Valve 26ᵇ, which is attached to the bar 26° is raised with and by the bar 26° allowing a certain predetermined amount of washing water to pass into the pipe 2 and onto the disk 63. It will also be seen that the wash water is distributed evenly to and through the solids as they pass the water distributing disk; that the length of time of subjection of the separated solids to the water, and to the air, is controllable by the velocity of movement of the solids, the thickness of the section or passage through which they pass and the length or thickness of the water applying and air applying sections; that the passages for the solids is continually enlarging from the inlet to the outlet so that they will not clog; that the discharge valves are controlled independently of the rotating speed of the machine; and that the discharge is controllable independently of the speed of rotation of the separating chamber.

The supply of mixture to the hopper 9 may be controlled if desired by any suitable means. I have indicated in Fig. 1 a supply pipe 9ª provided with a valve 9ᵇ which may be controlled by hand or by a float 9ᶜ.

If desired the disk 63 may be provided with means to prevent water being splashed off of the disk and into the air space above; as shown I have provided the disk with two concentrically disposed splash rings 63ˣ and 63ʸ; and as a further precaution a guard ring 6ˣ may be attached to the inner cone or wall 6 above the plate 8ª to prevent any water passing up to the perforation 7ª. Any water which might be trapped beneath ring 6ˣ can escape into passage 11 through perforations 6ᶻ in cone 6 just beneath the ring 6ˣ. Similarly any water which might be trapped beneath plate 8 can escape through perforations 6ʷ in cone 6. This provides against any water or syrup being carried to perforations designed to permit the passage of drying air.

What I claim is:

1. In centrifugal separating apparatus having a separating chamber, means for supplying mixture thereto; and centrifugal means for automatically controlling the supply by the amount of mixture in the chamber.

2. In centrifugal separating apparatus having a separating chamber and means to supply mixture thereto; of alternately opening and closing double annular valve means for controlling the discharge, whereby the travel of the separated solids through the machine is regulated.

3. In centrifugal separating apparatus having a bowl shaped separating chamber; an annular discharge opening and a pair of annular valves alternately opening and closing for said opening which when opened permit escape of the solids around the entire opening.

4. In apparatus for continuously separating suspended solids from liquids by centrifugal force; a separating chamber, a continuously enlarging passage for directing the separated solids to the discharge, and centrifugal means controlled by the mixture in the chamber for regulating the supply of mixture thereto.

5. In apparatus for continuously separating suspended solids from liquids containing same by centrifugal force, having means for directing the separated solids toward a discharge; a separating chamber, means for supplying mixture to the separator, centrifugal means for controlling the supply by the amount of mixture within the separating chamber, and means for positively regulating the discharge of the solids.

6. In apparatus for continuously separating suspended solids from liquids by centrifugal force, having means for directing the separated solids toward a discharge; a separating chamber, means for washing separated solids as they pass to the discharge, centrifugal means controlled by the mixture in the separator for regulating the supply of mixture to the separating chamber, and means for positively regulating the discharge of the solids.

7. In apparatus for continuously separating suspended solids from liquids by centrifugal force; a separating chamber, a continuously enlarging passage for directing the separated solids to the discharge therefrom, centrifugal means for controlling the supply by the amount of mixture within the separating chamber, and means for positively regulating the discharge of the solids.

8. Apparatus for continuously separating suspended solids from liquids, comprising means for separating the liquid from the solids by centrifugal force; and for directing the separated solids toward a discharge; and means for drying the separated solids as they pass to the discharge; with a pair of automatically and alternately operated valves for regulating the discharge of the dried material.

9. Apparatus for continuously separating suspended solids from liquids containing same, comprising means for separating the liquid from the solids by centrifugal force; and for directing the separated solids toward a discharge; means for washing the separated solids as they pass to the discharge, and means for drying the washed solids before reaching the discharge; with automatically operated valves for regulating the discharge of the dried material.

10. Apparatus for continuously separating suspended solids from liquids, comprising means for expelling the liquid from solids by centrifugal force, and for directing the separated solids toward a discharge, alternately opening valve means for controlling the escape of separated solids, means for washing the separated solids as they pass to the discharge, and means for drying the washed solids before reaching the discharge.

11. Apparatus for continuously separating suspended solids from liquids, comprising a separating chamber, means for separating the liquid from the solids by centrifugal force and for directing the separated solids toward a discharge; means for washing the separated solids as they pass to the discharge; means for drying the solids, means actuated by the mixture in the chamber for automatically maintaining a regulable supply of mixture to the separating chamber and a pair of alternately opening and closing valves for positively regulating the discharge of the solids.

12. Apparatus for continuously separating suspended solids from liquids, comprising a separating chamber, means for separating the liquid from the solids by centrifugal force and for directing the separated solids toward a discharge; means for drying the separated solids as they pass to the discharge; means controlled by the amount of mixture in the separating chamber for regulating the supply of mixture to said chamber and a pair of alternately opening and closing means for regulating the discharge of the solids.

13. Apparatus for continuously separating suspended solids from liquids containing same, comprising a separating chamber, means for separating the liquid from the solids by centrifugal force and for directing the separated solids toward a discharge; means for maintaining a regulable supply of mixture to the separator, means for controlling the supply by the amount of mixture within the separating chamber, and a pair of alternately opening and closing means for positively regulating the discharge of the solids.

14. Apparatus for continuously separating suspended solids from liquids, comprising a separating chamber, means for separating the liquid from the solids by centrifugal force and for directing the separated solids toward a discharge, means for washing the separated solids as they pass to the discharge; means for drying the washed solids; means for maintaining a regulable supply of mixture to the separator, means for controlling the supply by the amount of mixture within the separating chamber, and a pair of alternately opening and closing means for regulating the discharge of the solids.

15. Apparatus for continuously separating suspended solids from liquids, comprising a separating chamber, means for separating the liquid from the solids by centrifugal force and for directing the separated solids toward a discharge; and means for drying the separated solids as they pass to the discharge; means for maintaining a regulable supply of mixture to the separator, means for controlling the supply by the amount of mixture within the separating chamber, and a pair of alternately opening and closing means for regulating the discharge of the solids.

16. Apparatus for separating solids in suspension from liquids containing same, comprising a container having upwardly flaring perforated walls, means for introducing mixture to be separated into the container, means for rotating this container at high speed, whereby the fluid is separated from the solids by centrifugal force and the solids caused to move along the walls of the container; means within the container for supplying wash water to a portion of the solids in the container after they are separated; means for drawing air through the solids after they have been washed to dry the same and valves for controlling the movement of the solids.

17. Apparatus for separating solids in suspension from liquids containing same, comprising a container having perforations in its walls, the outer wall being upwardly flared, means for introducing mixture to be separated at the bottom of the container, means for rotating this container at high speed, whereby the fluid is separated from the solids by centrifugal force and the solids caused to move along the walls of the container; means within the container for supplying wash water to a portion of the solids in the container after they are separated; means for drawing air through the solids after they have been washed to dry the same; and valved means for positively controlling the discharge of the separated washed and dried solids from the container.

18. Apparatus for separating solids in suspension from liquids containing same, comprising a double walled bowl shaped container having perforations in its inner and outer walls, the outer wall being upwardly flared, means for introducing the mixture to be separated into the lower part of this container, means for rotating this container at high speed, whereby the fluid is separated from the solids by centrifugal force and the solids caused to move along the space between the walls of the container; means within the container for supplying wash water to a portion of the separated solids in the space between the walls; means for drawing air through the mass of solids at another part of the space after they have been washed to dry the same; and means for automatically regulating the discharge of the separated washed and dried solids from the container.

19. Apparatus for separating solids in suspension from liquids containing same, comprising a separator having perforations in its walls, means for introducing the mixture to be separated into the lower part of this separator, means for rotating this separator at high speed, means for supplying wash water to a portion of the solids in the separator after they are separated; means for maintaining a regulable supply of mixture to the separator, means for controlling the supply by the amount of mixture within the separator, and means for regulating the discharge of the solids.

20. Apparatus for separating solids in suspension from liquids containing same, comprising a separating chamber having perforations in its walls, means for introducing mixture to be separated into the separating chamber, means for rotating this separating chamber at high speed, means within the chamber for supplying wash water to a portion of the solids after they are separated; means for drawing air through the solids after they have been washed to dry the same, and means for regulating the discharge of the separated washed and dried solids from the chamber; with means for maintaining a regulable supply of mixture to the separator, means for controlling the supply by the amount of mixture within the separating chamber, and means for regulating the discharge of the solids.

21. Apparatus for continuously separating suspended solids from liquids, comprising means for separating the liquid from the solids by centrifugal force and for directing the separated solids toward a discharge, and means for washing the separated solids as they pass to the discharge; with valves for controlling the discharge of material from the container, and means for opening these valves alternately to allow the material to escape intermittently.

22. Apparatus for continuously separating suspended solids from liquids, comprising means for separating the liquid from the solids by centrifugal force and for directing the separated solids toward a discharge; and means for drying the separated solids as they pass to the discharge; with valves for controlling the discharge of material from the said container, and means for opening these valves alternately to allow the material to escape intermittently.

23. Apparatus for continuously separating suspended solids from liquids containing same, comprising means for separating the liquid from the solids by centrifugal force and for directing the separated solids toward a discharge at the upper end of the separating means, with a pair of annular valves for controlling the discharge of material, and means for operating these valves in alternation so as to allow the material to escape intermittently.

24. Apparatus for continuously separating suspended solids from liquids, comprising means for separating the liquid from the solids by centrifugal force and for directing the separated solids toward a discharge and means for washing the separated solids as they pass to the discharge; with a pair of annular valves for controlling the discharge of material, and means for operating these valves in alternation so as to allow the material to escape intermittently.

25. Apparatus for continuously separating suspended solids from liquids, comprising means for separating the liquid from the solids by centrifugal force and for directing the separated solids upwardly toward a discharge; and means for drying the separated solids as they pass to the discharge; with a pair of annular valves for controlling the discharge of material, and means for operating these valves in alternation so as to allow the material to escape intermittently.

26. Apparatus for separating solids in suspension from liquids containing same, comprising a container having perforations in its walls, the outer wall being upwardly flared, means for introducing the mixture to be separated into the lower part of this container, means for rotating this container at high speed, means for supplying wash water to a portion of the solids in the container after they are separated; valves for controlling the discharge of material from the upper end of said container, and means for operating these valves in alternation so as to allow the material to escape intermittently.

27. Apparatus for separating solids in suspension from liquids containing same, comprising a container having perforations in its walls, the outer wall being upwardly flared, means for introducing mixture to be separated into the container, means for rotating this container at high speed, whereby the fluid is separated from the solids by centrifugal force and the solids caused to move along the walls of the container; means within the container for supplying wash water to a portion of the solids in the container after they are separated; means for drawing air through the solids after they have been washed, and means for regulating the discharge of the separated washed and dried solids from the container; comprising valves at the upper end of said container, and means for operating these valves in alteration to allow the material to escape intermittently.

28. Apparatus for separating solids in suspension from liquids containing same, comprising a double walled bowl shaped container having perforations in its inner and outer walls, the outer wall being upwardly flared, means for introducing the mixture to be separated into the lower part of this container, means for rotating this container at high speed, whereby the fluid is separated from the solids by centrifugal force and the solids caused to ascend along the space between the walls of the container; means within the container for supplying wash water to a portion of the separated solids in the space between the walls; means for drawing air through the mass of solids at another part of the space after they have been washed; and valve means for automatically regulating the discharge of the separated washed and dried solids from the container.

29. In apparatus for separating solids from liquids by centrifugal force, having a valve controlling the escape of solids; a valve seat adapted to be packed with and by the materials being treated.

30. In apparatus for separating solids from liquids by centrifugal force, having a valve controlling the escape of solids; a valve seat which is adapted to be automatically filled and packed with the solids as they are discharged.

31. In apparatus for separating solids from liquids by centrifugal force; an annular outlet, an annular valve closing said outlet, an annular groove for the seat of the valve, adapted to retain separated solids for packing the valve when closed.

32. In apparatus for separating solids in suspension from liquids containing same; a container whereby the fluid is separated from the solids by centrifugal force; means within the container for supplying wash water to a perforated part of the container containing separated solids; a screen interposed between the perforated part of the container and the water supplying means, and dividing plates interposed between the screen and container wall.

33. In apparatus for separating solids in suspension from liquids containing same; a container whereby the fluid is separated from the solids by centrifugal force; a disk within the container for supplying wash water to a perforated part of the container containing separated solids, said disk having convolutely disposed ribs on its upper face; a screen interposed between the perforated part of the container and the disk; spaced plates interposed between the screen and container wall; and means for regulating the discharge of the separated and washed solids.

34. Apparatus for separating solids in suspension from liquids containing same, comprising a container having perforations in its walls the outer wall being upwardly flared and whereby the fluid is separated from the solids by centrifugal force and the solids caused to move along the walls of the container; a disk within the container for supplying wash water to a perforated part of the container containing separated solids, said disk having convolutely disposed ribs on its upper face; a screen interposed between the perforated part of the container and the disk, spaced plates interposed between the screen and perforated wall of the container, and means for regulating the discharge of the separated and washed solids.

35. Process of separating solids in suspension from liquids containing same, consisting in continuously introducing the mixture to be separated into a container wherein the fluid is separated from the solids by centrifugal force and the separated solids caused to move outward along the walls of the container, supplying wash water to a portion of the separated solids in the container after they are separated and passing to the discharge, drying the separated and washed solids, and intermittently discharging them at predetermined intervals the several operations being performed simultaneously and continuously.

36. Process of separating solids in suspension from liquids containing same and drying the solids; consisting in separating the fluid from the solids by centrifugal force; moving the solids through a definite space; passing wash water through the suspended solids in one portion of the space; drawing air through the mass of solids after they have been washed in another portion of the space to dry the solids; and intermittently discharging the separated washed and dried solids at predetermined intervals.

37. Process of separating solids in suspension from liquids containing same, consisting in introducing the mixture to be separated into a container wherein the fluid is separated from the solids by centrifugal force and the separated solids caused to move outward along the walls of the container; supplying wash water to the solids in a portion of the container after they are separated; drawing air through the washed solids in another portion of the container after they are separated; drawing air through the washed solids in another portion of the container to dry the same; intermittently discharging the separated, washed and dried solids from the container while maintaining a regulable supply of mixture thereto; and controlling the supply of fluid to the container by the amount of mixture within the separating chamber.

38. Process of treating mixtures of solids in suspension; consisting in separating the fluid from the solids; causing the separated solids to move toward a discharge in a body or layer of regulated thickness; applying wash water to successive portions of the solids at one point; then passing air through successive portions of the washed solids at another point to dry the same.

39. Process of treating mixtures of solids in suspension in liquids; consisting in separating the fluid from the solids; causing the separated solids to move toward a discharge in a body or layer of regulated thickness; applying wash water to successive portions of the solids at one point; then passing air through successive portions of the washed solids at another point to dry the same; and intermittently discharging the separated, washed and dried solids, while constantly maintaining a regulable supply thereof.

40. In the process of treating solids separated from liquids containing same; moving the separated solids through a confining passage toward a discharge; applying wash water to successive portions of the separated solids in the passage as they move toward the discharge; and passing air through such washed solids at another part of the passage after they have been washed to dry them.

41. In the process of treating solids separated from liquids containing same; causing the separated solids to move through a confining passage toward a discharge; applying wash water to successive portions of the separated solids in the channel as they pass to the discharge; then passing air through successive portions of the solids at another part of the channel after they have been washed; and periodically intermittently discharging the separated washed and dried solids.

42. Process of treating mixtures of solids in suspension in liquids, consisting in separating the fluid from the solids; causing the separated solids to move outward along the walls of a container by centrifugal force; applying wash water to the solids at one point in the container; then passing air through the washed solids at another point in the container to dry the same.

43. The process of treating mixtures of solids in suspension in liquids, consisting in separating the fluid from the solids; causing the separated solids to move outward along the walls of a container by centrifugal force; applying wash water to successive portions of the washed solids at one point in the container; then passing air through successive portions of the washed solids at another point in the container; and periodically intermittently discharging the separated washed and dried solids from the container while constantly maintaining a regulable supply thereof.

44. In apparatus having means for separating liquids from the solids by centrifugal force; concentrically disposed annular valves alternately opening and closing for measuring and controlling the discharge of the separated solids; and means to operate such valves.

45. In apparatus having means for continuously separating liquids from solids by centrifugal force and directing the separated solids toward the discharge; a pair of concentric annular valves alternately opening and closing and operating conjunctively to positively measure and control the discharge; and means for operating such valves.

46. In apparatus for continuously separating suspended solids from liquids containing same, having means for separating the liquid from the solids by centrifugal force and a gradually enlarging passage for directing the separated solids toward the discharge and an annular discharge outlet; a pair of concentric annular valves operating conjunctively to positively measure and control the discharge of the solids from such outlet; and means for operating these valves.

47. In apparatus for treating solids, means for washing the solids; means for supplying the wash water; and means for controlling the supply of wash water by the amount of solids being discharged from the apparatus.

48. In apparatus for treating solids, a centrifugal chamber; means for supplying solids thereto; means for supplying wash water to the solids; and means controlling the amount of wash water supplied by the amount of solids discharged from the chamber.

49. In apparatus for treating solids, a centrifugal chamber; means for supplying solids thereto; means for washing the solids; means for supplying the water for washing purposes; and means for automatically controlling the supply of wash water by the amount of solids discharged from the chamber.

50. In a centrifugal separating apparatus having a separating chamber; means for supplying mixture thereto; a flexible pocket communicating with said chamber; and means controlled by such pocket for regulating the supply of mixture to the chamber.

51. In apparatus for separating suspended solids from liquids by centrifugal force having a separating chamber, means for supplying mixture to the chamber; a valve for controlling the supply; a flexible pocket communicating with the chamber; and means controlled by the amount of material in the pocket for regulating the supply of the mixture to the chamber.

In testimony that I claim the foregoing as my own I affix my signature.

ROBERT M. THOMPSON.